April 17, 1956 M. J. ANTON 2,741,961
TIMERS FOR SELF-DEVELOPING CAMERAS
Filed Oct. 2, 1952 5 Sheets-Sheet 1
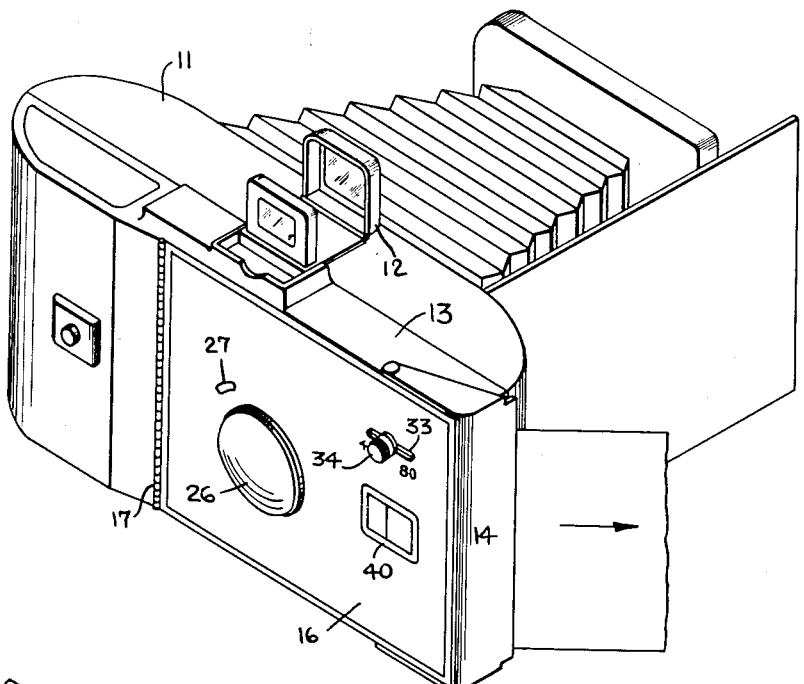
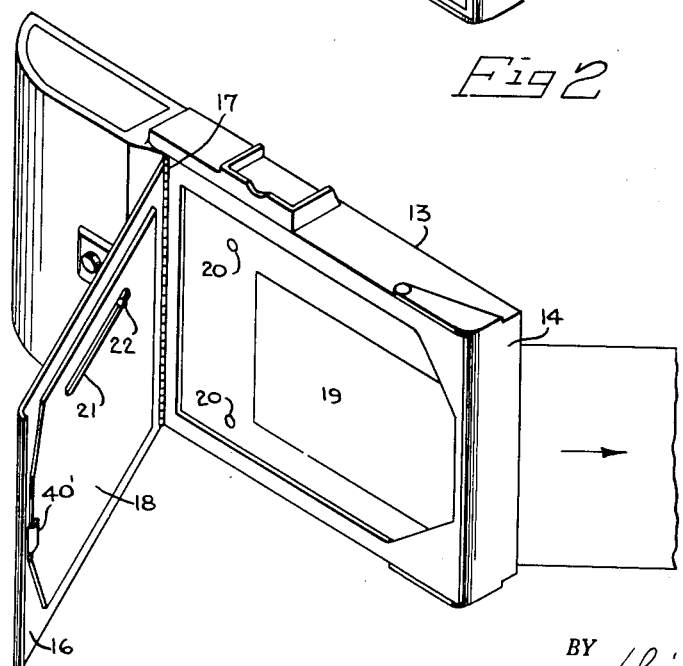
INVENTOR.
MARK J. ANTON
BY
ATTORNEYS April 17, 1956 — M. J. ANTON — 2,741,961
TIMERS FOR SELF-DEVELOPING CAMERAS
Filed Oct. 2, 1952 — 5 Sheets-Sheet 2

INVENTOR.
MARK J. ANTON
BY
ATTORNEYS

April 17, 1956 M. J. ANTON 2,741,961
TIMERS FOR SELF-DEVELOPING CAMERAS
Filed Oct. 2, 1952 5 Sheets-Sheet 3

INVENTOR.
MARK J. ANTON
BY
ATTORNEYS

April 17, 1956  M. J. ANTON  2,741,961
TIMERS FOR SELF-DEVELOPING CAMERAS
Filed Oct. 2, 1952  5 Sheets-Sheet 4
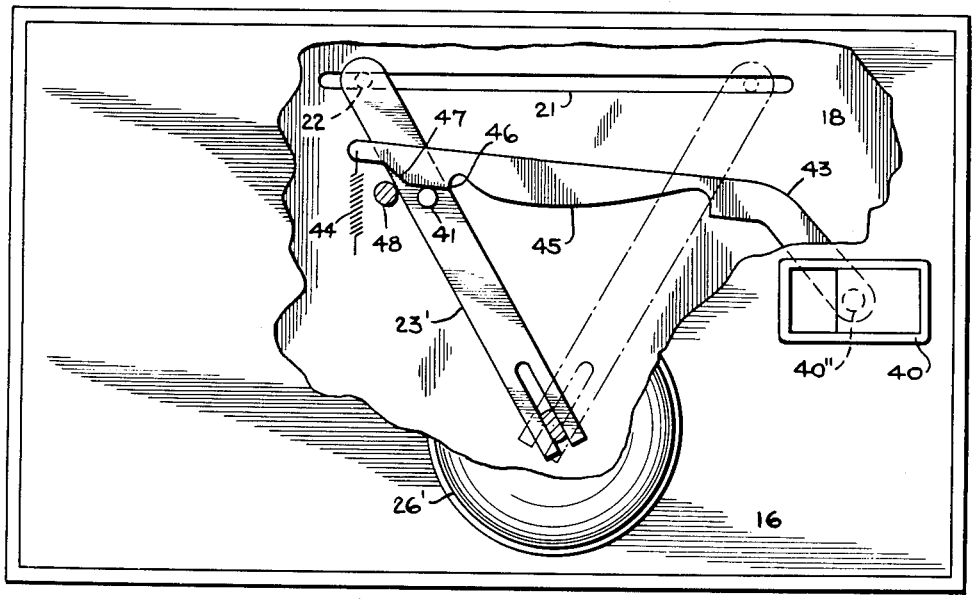
Fig 7  NORMAL CATCH CLOSED
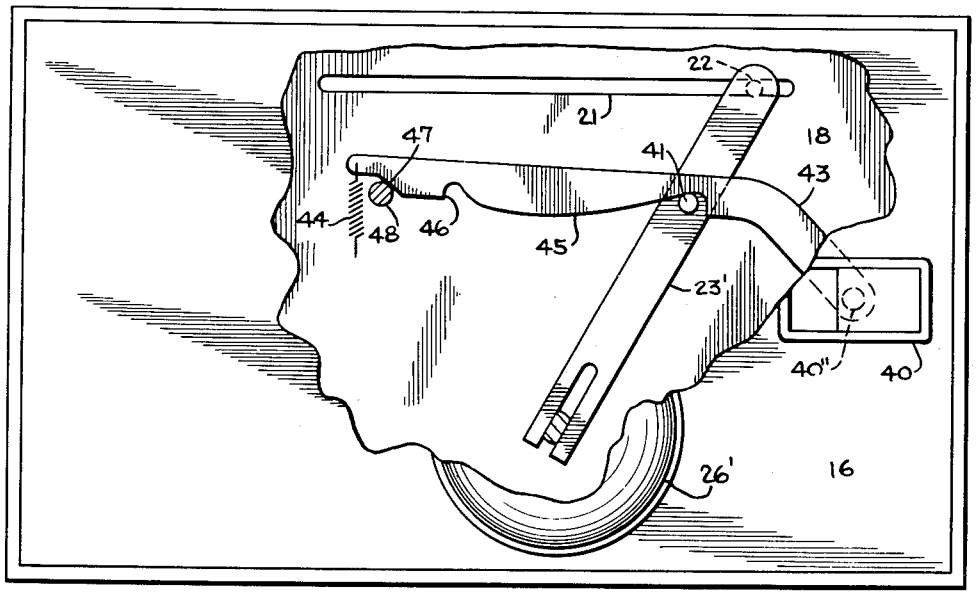
Fig 8  CATCH CLOSED
INVENTOR.
MARK J. ANTON
ATTORNEYS April 17, 1956   M. J. ANTON   2,741,961
TIMERS FOR SELF-DEVELOPING CAMERAS
Filed Oct. 2, 1952   5 Sheets-Sheet 5
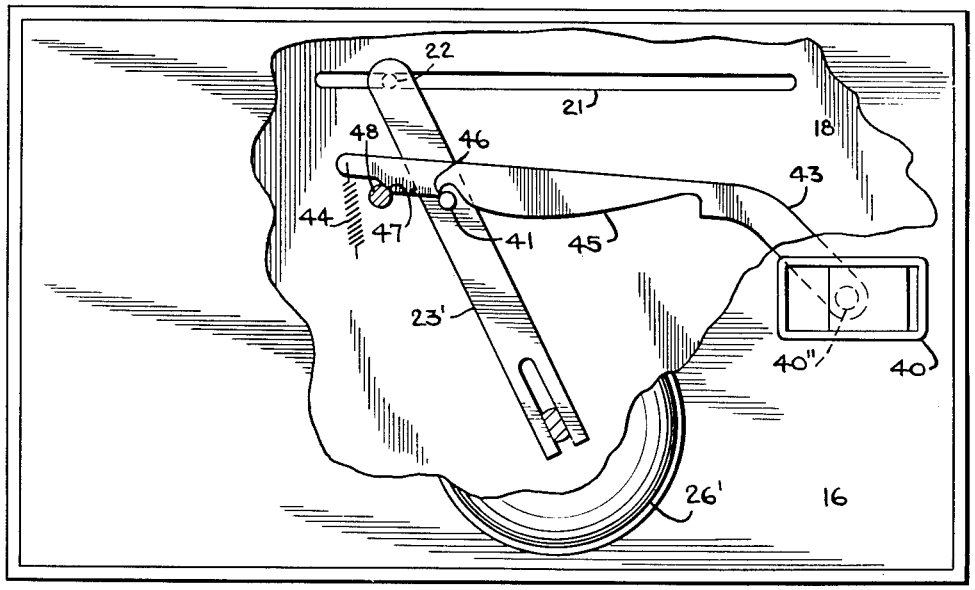
Fig 9  CATCH RELEASED
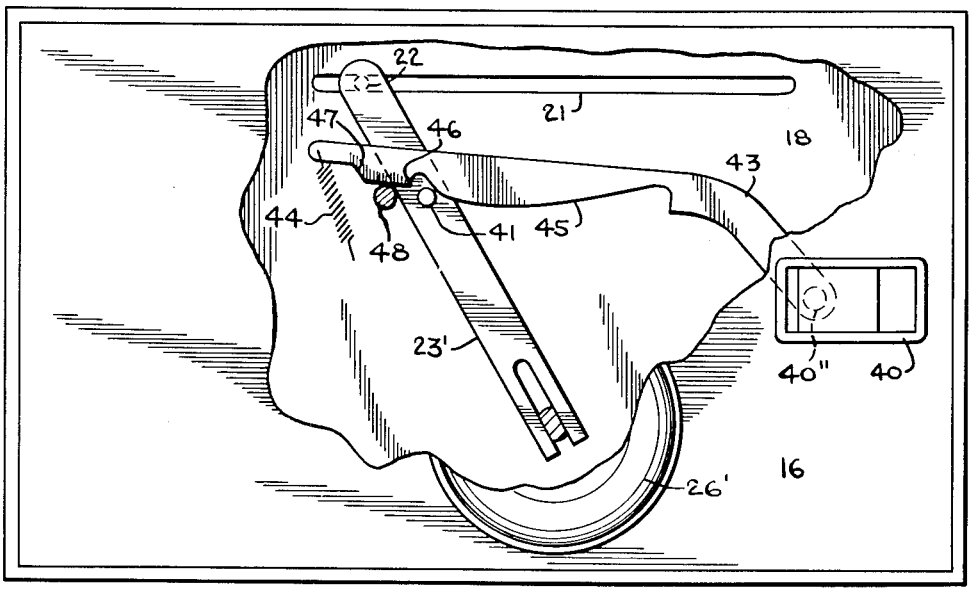
Fig 10  CATCH OPENED TO FULL EXTENT
INVENTOR.
MARK J. ANTON
BY
ATTORNEYS

United States Patent Office 2,741,961
Patented Apr. 17, 1956

2,741,961

TIMERS FOR SELF-DEVELOPING CAMERAS

Mark J. Anton, West Orange, N. J.

Application October 2, 1952, Serial No. 312,725

23 Claims. (Cl. 95—14)

This invention relates to timers for self-developing cameras and has for an object to provide an interval timer attached to a camera of the self-developing type and serving to give a signal after a predetermined development period.

Another object is to provide such a combination camera and timer which will give a visual and/or audible signal.

Another object is to provide such a combination camera and timer having automatic means operated as an incident to the initiation of the picture development period to cause the interval timer to begin to operate whereby a signal is given automatically to indicate the desired end of the development period.

Another object is to provide such a combination camera and timer wherein the interval timer is started by the movement of the print paper, this being accomplished preferably by a prong entering a hole in the print paper so that as the print paper is shifted to initiate the picture development step, the prong will be moved with the paper and the interval timer operation will be started.

Another object is to provide such a device including a cam surface adapted to move the prong out of the hole in the print paper after the paper has moved the prong the desired extent, means being preferably provided to shift the position of the cam member at will so that the time interval may be correspondingly varied to give the signal at different time intervals after the beginning of the picture development period.

Another object is to provide, in connection with a camera having a catch, for a closure element, an interval timer with means operated by the timer for moving said catch to open position whereby the closure springs open after the desired time interval and thereby indicates to the user that the time interval has elapsed.

Further objects and advantages of this invention will be apparent from consideration of the specification as illustrated by the accompanying drawings of possible embodiments of the invention, in which drawings:

Fig. 1 is a perspective view of such a combination and interval timer;

Fig. 2 is a partial view of the construction shown in Fig. 1, the camera rear cover being shown swung open;

Fig. 7 is a view similar to Fig. 3 showing a modified form of construction certain parts being broken away;

Fig. 8 is a fragmentary view of the device of Fig. 7 with the parts in the positions at the beginning of the development time interval;

Fig. 9 shows the same parts in the positions that they hold at the end of the time interval, the catch having just been released, and Fig. 10 shows the parts in the positions they hold after the catch has been moved to its full extent.

Figure 3:
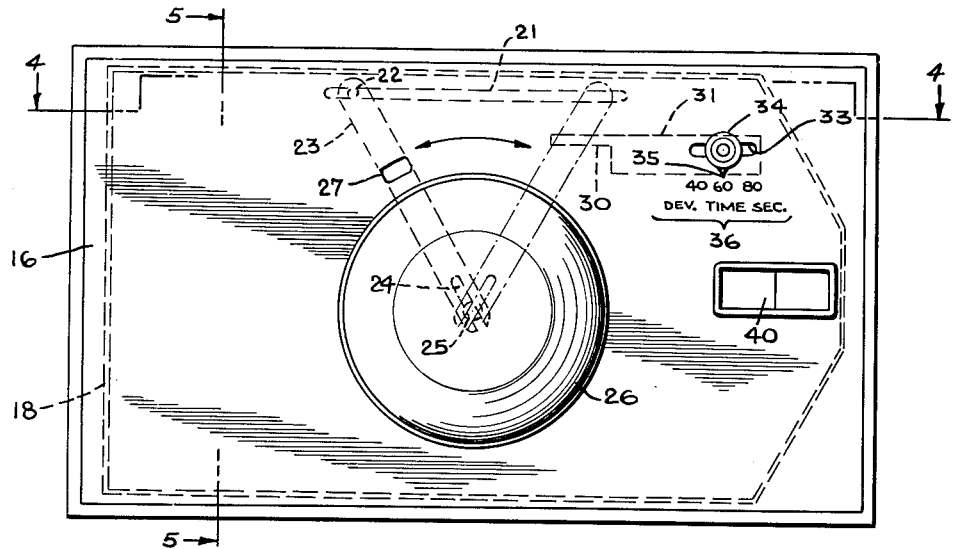
Fig. 3 is an elevation of the rear camera cover.

While the invention is illustrated in connection with the Polaroid Land camera, this is merely done for convenience as the camera proper may take any desired form. The construction and operation of the Polaroid Land camera may be understood more fully by reference to U. S. Patents Nos. 2,435,717, 2,455,111, 2,491,719, 2,491,769, 2,510,306.

In cameras of this type the photographic material is part of a web which comprises negative and positive sheet material between which is located a number of small frangible capsules, one for each picture, containing the required developer material. After the exposure has been made the web is drawn lengthwise between two pressure rollers. This movement breaks the capsule for said picture and spreads the developer over the surface of the negative.

This initiates the development period. After development is completed the positive picture must be stripped away from the negative. In the case of the Polaroid Land camera this time is about sixty seconds. This time is fairly critical and it is the purpose of the present invention to provide a signal mechanism which will notify the user when a certain time has elapsed since the beginning of the development period.

Referring to said drawings, the camera proper comprises the front section 11 which carries the usual lens, lens support, shutter, bellows, and view finder which may be like the one designated at 12; and the back section 13 which carries the film supply roll, the film squeezing rolls (not shown) and the usual film cutter bar 14. The said back section is provided with the rear cover 16, hinged thereto at 17. The back of the rear cover carries the pressure plate 18. This plate, when the cover is closed, presses against the web of print paper 19 which contains pairs of holes 20 at intervals along its length, one pair of holes being provided for each picture on the web.

The pressure plate 18 is provided with a slot 21 through which projects the timer setting prong 22 (Figs. 2, 4, 5 and 6), said prong being shown carried on the end of a lever 23 located between the cover 16 and the pressure plate 18. Said lever is suitably connected to the interval timer for which purpose it may be provided at its other end with a slot 24 which straddles a more or less rectangular portion 25¹ of a shaft 25 extending rearwardly from the interval timer 26. This timer may be of known or other suitable construction and may, for example, be of the form shown in U. S. Patent 2,194,448. Such timers usually consist of an energy storing spring, a gear train, an escapement mechanism, and a signal device which may be visual and/or audible. Such interval timers usually have an operating member such as the shaft 25 which, when turned by the operator, winds the spring and stores energy for the audible alarm and usually also releases the escapement mechanism. It is thereupon returned slowly by the energy storing spring at a rate determined by the escapement mechanism until it arrives at its normal or home position at which time it allows the audible signal to be operated. In the form shown a visual signal is also provided. This is effected by providing a window 27 in the rear cover 16 through which a part of the lever 23 is visible when the lever is in home position. The effect will be increased if that portion, at least, of the lever is of a bright color readily visible through the window 27.

Figure 4:
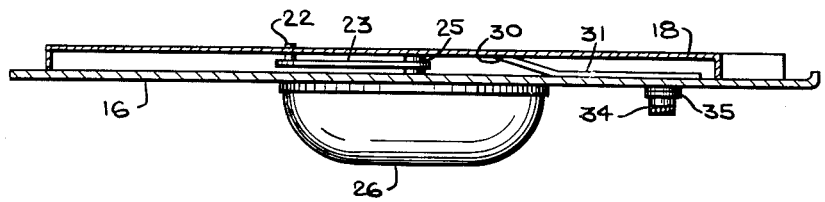
Fig. 4 is a cross section taken on the line 4—4 of Fig. 3.
Figure 5:
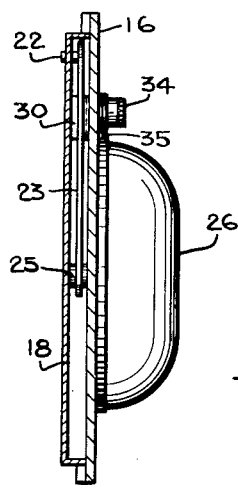
Fig. 5 is a cross section taken on the line 5—5 of Fig. 3.
Figure 6:
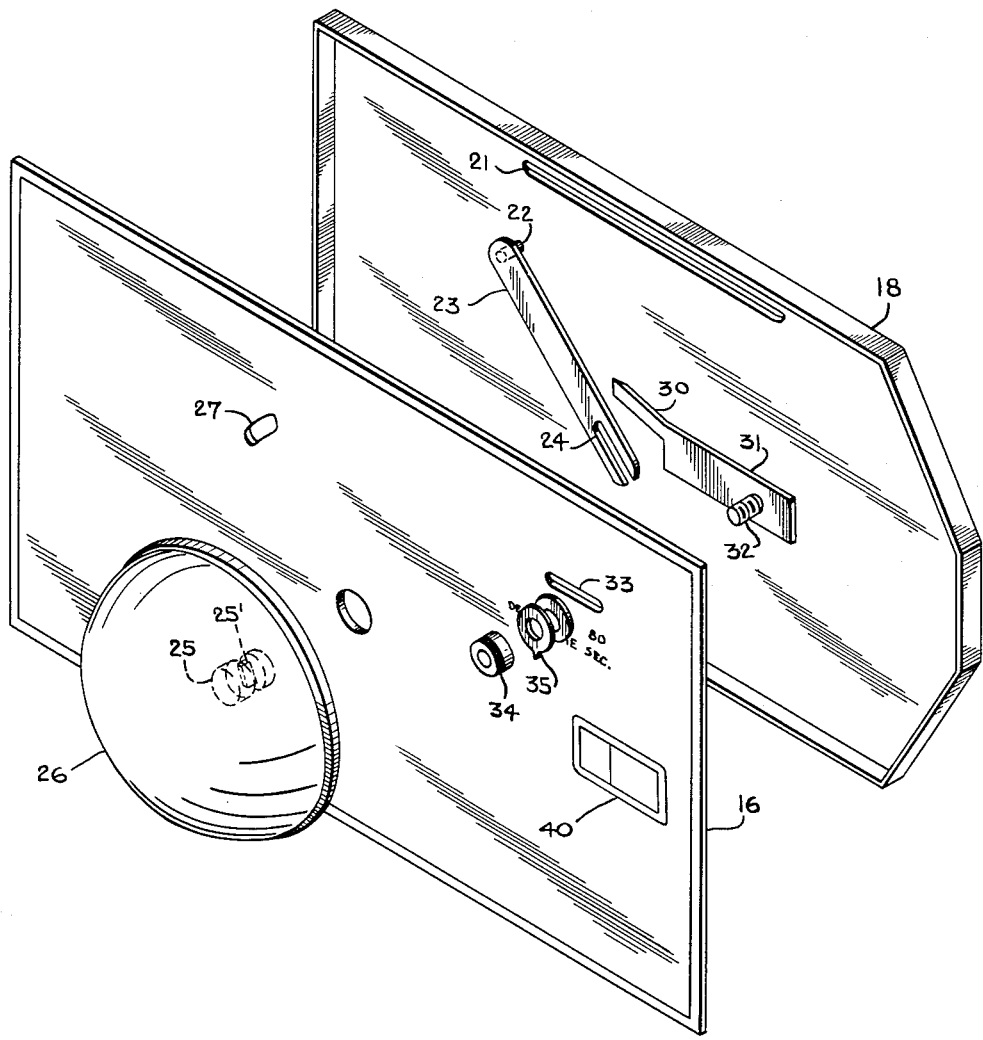
Fig. 6 is an exploded perspective view showing the camera's rear cover and the pressure plate, together with the interval timer and the parts for operating the timer.

Since the maximum movement given to the prong 22 is desirably less than the movement given to the web, it is desirable to provide suitable means to draw the prong 22 out of the hole 20 in the web after the desired motion has been given to prong 22 and lever 23. This may be accomplished by means of the cam 30 (Figs. 3, 4, and 6). The inclined cam surface 30 will be engaged by lever 23 and will, at the proper time, push the lever 23 outwardly and disengage the prong 22 from the hole 20.

Since the photographic material is thermal sensitive it is desirable to provide means for varying the signal interval. This is accomplished in the form shown by mounting the cam 30 on a slide 31 carried by a stud 32 passing through a slot 33 in the rear cover 16. The stud is provided with a suitable operating knob in the form of a clamping nut 34 and preferably a pointer 35 playing over a scale 36. In the form shown the scale is calibrated in seconds from 40 to 80 although it may sometimes be desirable to have the graduations in degrees of temperature.

*Operation*

The operator sets the time adjusting operating knob 34 in such a manner that the pointer 35 indicates on the scale the desired development time. He thereupon makes the proper exposure in the usual manner. Thereupon, he draws the web forward in the usual way to begin the development operation. While the web is being drawn forward, the prong 22 drops into the upper hole 20 (if it is not already there) so that upon further movement of the web the lever 23 is swung clockwise (Fig. 3) to a position something like the right hand dotted line position shown in Fig. 3. The slot 24 permits the necessary movement on the rectangular portion $25^1$ of the shaft 25 to permit the prong 22 to have a rectilinear movement in slot 21 while the lever rotates shaft 25. As the lever approaches the end of its desired extent of motion it strikes the inclined cam 30 and is moved outwardly thereby until the prong 22 is withdrawn from the hole 20, thus permitting the web to be drawn further to the full extent of its desired movement. The resulting rotation of shaft 25 causes the energy storing spring in the timer 26 to be wound and the audible signal (bell striker) mechanism to be loaded and at the same time the escapement is released. Thereupon the shaft 25 rotates in a return direction (counterclockwise, Fig. 3) under control of the escapement. As the return movement of shaft 25 is being completed, the striker is released causing it to ring a bell to give the desired audible signal. This indicates to the user that the necessary development time has elapsed and he will thereupon strip the picture away from the negative. In place of the audible signal, or to supplement it, the movement of the lever 23 in front of the window 27 will serve to indicate to the user that the desired development time has expired.

Instead of varying the time interval by adjusting the position of the cam surface 30, it is also contemplated to provide for automatic variation of the time interval in response to temperature. Thus, the balance wheel of the escapement may have segmental rim portions made of bi-metallic material so arranged that the center of gravity of the rim segments will move outwardly with decreasing temperature so as to slow down the balance wheel and, therefore, automatically provide a longer time interval.

Figs. 7 through 10 show another form the invention may take. In this form of construction an interval timer $26^1$ is provided which may be the same as the timer 26 of Figs. 1 and 3 through 6, it being understood however that the signaling means thereof may be omitted if desired. In this form of construction the slidable catch member 40 is moved by the interval timer to released position after the expiration of the desired time interval. As a result thereof its latch member $40^1$ (Fig. 2) is released from its keeper surface in the back section 13 of the camera allowing the rear cover 16 to spring outwardly under the action of the pressure plate 15, aided if desired by a separate spring. The means for accomplishing this result will now be described.

In this form of construction a lever $23^1$ is provided, similar to the lever 23. This lever carries the prong 22 movable in the slot 21 in the pressure plate 18. Lever $23^1$ also carries a stud 41. Pivoted to the catch at $40^{11}$ is a link 43 lying between the pressure plate 18 and the rear cover 16. Said link 43 is preferably biased in a counter-clockwise direction by means of a light tension spring 44. The link 43 is provided with a hook 46 and a rear cam surface 47, said cam surface being adapted to cooperate at times with the stationary stud 48 carried by the rear cover 16. In the position of the parts shown in Fig. 7 the catch has been closed. Thus the parts are in the position where the camera is ready for making an exposure or an exposure has been made.

If now the web 19 is drawn forward as described above the prong 22 will at a certain stage of the web advancement drop into the hole 20 causing the lever $23^1$ to be moved to the position shown in Fig. 8. The extent of this movement is determined by the position of the cam 30 (not shown in Figs. 7–10).

The clockwise movement of the lever $23^1$ from the position of Fig. 7 to that of Fig. 8 has wound the timer spring and released the escapement for operation. Therefore the lever $23^1$ gradually returns in a counter-clockwise direction. When it reaches a position slightly to the right of the position shown in Fig. 9 its stud 41 engages the hook 46 on link 43 and begins to draw the link 43 leftward until the catch 40 has been shifted leftwardly sufficiently far to cause the latch $40^1$ (Fig. 2) to be release from its keeper surface on the back section 13. This causes the rear cover 16 to snap outward, thus producing both an audible and a visual signal indicating that the required development time interval has elapsed. Furthermore, the timer has thus automatically readied the camera for the next operation, the stripping of the positive picture away from the negative.

The catch 40 is able to move a short distance beyond its cover releasing position and, due to the detent structure usually present in such latches, it will in fact snap to its fully open position shown in Fig. 10. During the movement of the link 43 from the position of Fig. 9 to the position of Fig. 10 the cam surface 47 thereon rides upwardly on the stud 48 thus raising the hook 46 above the stud 41. The further operation of the clockwork causes the lever $23^1$ to move further counter-clockwise until it reaches the position shown in Fig. 10. If the catch 40 is not provided with a detent to complete its full opening movement the continued movement of lever $23^1$ from the position of Fig. 9 to the position of Fig. 10 will cause the link 43 to be lifted due to the cam surface 47 thereon riding up on the stud 48. This movement is terminated when the lever $23^1$ strikes a suitable stop which may be the said stud 48 on the rear cover 16.

After the operator has stripped the picture out of the camera he closes the rear cover 16 and moves the catch to closed position. This returns the parts to the positions shown in Fig. 7 and the camera is ready for the next exposure.

The purpose of this illustrative construction is to provide any suitable connection from the interval timer to open the catch 40 and that thereafter the train of connections is such that the catch 40 may again be closed by the operator after the interval timer has completed its return operation.

It will be noted that the constructions shown and described will serve admirably to accomplish the objects stated above. It is to be understood, however, that the constructions disclosed above are intended merely as illustrative of the invention and not as limiting as various other modifications therein may be made without departing from the invention as defined by a proper interpretation of the claims which follow:

I claim:

1. In a self-developing camera having a web including a photo-sensitive surface and provided with at least one perforation per picture, and means for exposing said surface to a light image, said web being advanceable by the operator to initiate the development period, the combination therewith of an interval timer carried by said camera and means operated by the movement of the web for starting operation of the interval timer said means comprising a member which may enter said perforation and be moved thereby when said web is moved.

2. The combination according to claim 1, together with means for moving said member out of said perforation after said member has been moved a predetermined distance by said web.

3. The combination according to claim 1, together with a cam arranged to move said member out of said perforation after said member has been moved a predetermined distance by said web.

4. The combination according to claim 1, together with a cam arranged to move said member out of said perforation after said member has been moved a predetermined distance by said web said cam being adjustable at will to different positions to vary the extent of movement of said member before it is moved out of said perforation.

5. In a self-developing camera having a web including a photo-sensitive surface and provided with at least one perforation per picture, and means for exposing said surface to a light image, said web being advanceable by the operator to initiate the development period, the combination therewith of an interval timer having means to sound an alarm after a time interval carried by said camera and means operated by the movement of the web for starting operation of the interval timer and determining the length of the time interval said means comprising a prong which may enter said perforation and be moved thereby when said web is moved.

6. The combination according to claim 5, together with means for moving said prong out of said perforation after said prong has been moved a predetermined distance by said web.

7. The combination according to claim 5, together with a cam arranged to move said prong out of said perforation after said prong has been moved a predetermined distance by said web.

8. The combination according to claim 5, together with a cam arranged to move said prong out of said perforation after said prong has been moved a predetermined distance by said web, said cam being adjustable at will to different positions to vary the extent of movement of said prong before it is moved out of said perforation.

9. In a self-developing camera having a web including a photo-sensitive surface and provided with at least one perforation per picture, and means for exposing said surface to a light image, said web being advanceable by the operator to initiate the development period, the combination therewith of an interval timer having means to sound an alarm after a time interval carried by said camera and means operated by the movement of the web for starting operation of the interval timer and determining the length of the time interval, said means comprising an oscillatable shaft, a lever oscillatable therewith and a prong carried by said lever, which prong may enter said perforation whereby said prong is moved and the lever and shaft oscillated in one direction when said web is advanced.

10. The combination according to claim 9, together with means for moving said prong out of said perforation after said prong, lever and shaft have been moved a predetermined distance by said web.

11. The combination according to claim 9, together with a cam arranged to move said prong out of said perforation after said prong, lever and shaft have been moved a predetermined distance by said web.

12. The combination according to claim 9, together with a cam arranged to move said prong out of said perforation after said prong, lever and shaft have been moved a predetermined distance by said web, said cam being adjustable at will to different positions to vary the extent of movement of said prong, lever and shaft before the prong is moved out of said perforation.

13. The combination according to claim 9, together with means dependent upon the position of said lever for giving a visual signal to indicate the expiration of the time interval.

14. In a self-developing camera having a web including a photo-sensitive surface and provided with at least one perforation per picture, and means for exposing said surface to a light image, said web being advanceable by the operator to initiate the development period, the combination therewith of an interval timer carried by said camera and means operated by the movement of the web for starting operation of the interval timer and determining the length of the time interval, said means comprising an oscillatable shaft, a lever oscillatable therewith and a prong carried by said lever, which prong may enter said perforation whereby said prong is moved and the lever and shaft oscillated in one direction when said web is advanced; an openable cover for normally enclosing said web, a catch for holding said cover closed and means connected with said oscillatable lever for releasing said catch during the return movement of said lever.

15. The combination according to claim 14 in which the connecting means between said lever and said catch is disabled after releasing said catch so that the catch may be returned to locking position.

16. In a self-developing camera having a web including a photo-sensitive surface and provided with at least one perforation per picture, and means for exposing said surface to a light image, said web being advanceable by the operator to initiate the development period, the combination therewith of an interval timer carried by said camera and means operated by the movement of the web for starting operation of the interval timer and determining the length of the time interval, said means comprising an oscillatable shaft, a lever oscillatable therewith and a prong carried by said lever, which prong may enter said perforation whereby said prong is moved and the lever and shaft oscillated in one direction when said web is advanced; an openable cover for normally enclosing said web, a catch for holding said cover closed and a link connected to said catch and operable by said oscillatable lever for releasing said catch during the return movement of said lever.

17. In a self-developing camera having a web including a photo-sensitive surface, an openable cover for normally enclosing said web, a catch for normally holding said cover closed, and means for exposing said surface to a light image, said web being advanceable by the operator to initiate the development period, the combination therewith of an interval timer carried by said camera and means operated by the movement of the web for starting operation of the interval timer and determining the length of the time interval, and means operated by said interval timer for releasing said catch after a certain predetermined time.

18. The combination according to claim 17 in which the catch releasing means constitutes a connection from the interval timer to the catch and means operated as an incident to the releasing of said catch to interrupt said connection to permit replacement of said catch.

19. In a self-developing camera having a web including a photo-sensitive surface and provided with at least one perforation per picture, a pressure plate which may bear against said web, and means for exposing said surface to a light image, said web being advanceable lengthwise by the operator to initiate the development period, the combination therewith of an interval timer, having means to give a signal after a time interval, carried by said camera and means operated by the movement of the web for starting operation of the interval timer and determining the length of the time interval, said means comprising an oscillatable shaft having a flattened portion, a lever oscillatable therewith and having a slot embracing said flattened portion, and a prong carried by said lever extending through a slot in the pressure plate in line with the path of movement of the perforation in the web, which prong may enter said perforation whereby said prong is moved and the lever and shaft oscillated in one direction when said web is advanced, an openable cover for normally enclosing said web, a catch for holding said cover closed and means connected with said oscillatable lever for releasing said catch during the return movement of said lever.

20. In a self-developing camera having a web including a photo-sensitive surface and provided with at least one perforation per picture, a pressure plate which may bear against said web, and means for exposing said surface to a light image, said web being advanceable lengthwise by the operator to initiate the development period, the combination therewith of an interval timer, having means to give a signal after a time interval, carried by said camera and means operated by the movement of the web for starting operation of the interval timer and determining the length of the time interval, said means comprising an oscillatable shaft having a flattened portion, a lever oscillatable therewith and having a slot embracing said flattened portion, and a prong carried by said lever extending through a slot in the pressure plate in line with the path of movement of the perforation in the web, which prong may enter said perforation whereby said prong is moved and the lever and shaft oscillated in one direction when said web is advanced, a cam located in the path of the lever arranged to move said lever to withdraw said prong from said perforation, an openable cover for normally enclosing said web, a catch for holding said cover closed and means connected with said oscillatable lever for releasing said catch during the return movement of said lever.

21. The combination according to claim 20 in which the cam is adjustable to different positions to vary the extent of movement of said lever and said shaft before the prong is disengaged from the perforation.

22. In a self-developing camera having a web including a photo-sensitive surface and provided with at least one perforation per picture, and means for exposing said surface to a light image, said web being advanceable lengthwise by the operator to initiate the development period, the combination therewith of an interval timer, having means to give a signal after a time interval, carried by said camera and means operated by the movement of the web for starting operation of the interval timer and determining the length of the time interval, said means comprising an oscillatable shaft, a lever oscillatable therewith, a prong carried by said lever extending into the path of movement of the perforation in the web, which prong may enter said perforation whereby said prong is moved and the lever and shaft oscillated in one direction when said web is advanced, and a cam located in the path of the lever arranged to move said lever to withdraw said prong from said perforation.

23. The combination according to claim 22 in which the cam is adjustable to different positions to vary the extent of movement of said lever and said shaft before the prong is disengaged from the perforation.

References Cited in the file of this patent

UNITED STATES PATENTS

| | | |
|---|---|---|
| 2,325,120 | Forse | July 27, 1943 |
| 2,444,170 | Sabel | June 29, 1948 |
| 2,543,160 | Fairbanks | Feb. 27, 1951 |